United States Patent
Jovicevic (10) Patent No.: US 9,278,661 B2
(45) Date of Patent: Mar. 8, 2016

(54) VEHICLE AIRBAG ASSEMBLY

(71) Applicant: Nissan North America, Inc., Franklin, TN (US)

(72) Inventor: Niko Jovicevic, Novi, MI (US)

(73) Assignee: Nissan North America, Inc., Franklin, TN (US)

(*) Notice: Subject to any disclaimer, the term of this patent is extended or adjusted under 35 U.S.C. 154(b) by 8 days.

(21) Appl. No.: 14/065,766

(22) Filed: Oct. 29, 2013

(65) Prior Publication Data

US 2015/0115575 A1    Apr. 30, 2015

(51) Int. Cl.
*B60R 21/213*    (2011.01)

(52) U.S. Cl.
CPC .................... *B60R 21/213* (2013.01)

(58) Field of Classification Search
CPC ............... B60R 21/213; B60R 21/232; B60R 2021/161; B60R 21/23138
See application file for complete search history.

(56) References Cited

U.S. PATENT DOCUMENTS

| | | | |
|---|---|---|---|
| 5,788,270 A | 8/1998 | HÅland et al. | |
| 6,095,551 A | 8/2000 | O'Docherty | |
| 6,234,516 B1* | 5/2001 | Boxey | B60R 21/232 280/729 |
| 6,305,707 B1 | 10/2001 | Ishiyama et al. | |
| 6,361,068 B1* | 3/2002 | Stein | B60R 21/232 280/730.2 |
| 6,609,726 B1 | 8/2003 | Stutz et al. | |
| 6,733,035 B2 | 5/2004 | Thomas et al. | |
| 6,902,188 B2 | 6/2005 | Nakamura et al. | |
| 7,380,815 B2* | 6/2008 | Rose | B60R 21/213 280/728.2 |
| 7,503,583 B2 | 3/2009 | Muller | |
| 7,625,005 B2 | 12/2009 | Saberan et al. | |
| 8,020,888 B2* | 9/2011 | Cheal | B60R 21/213 280/729 |
| 8,033,569 B2* | 10/2011 | Yamanishi | B60R 21/232 280/728.2 |
| 8,056,924 B2 | 11/2011 | Hatfield et al. | |
| 8,196,952 B2 | 6/2012 | Walston et al. | |
| 8,414,020 B2* | 4/2013 | Beppu | B60R 21/232 280/728.2 |
| 8,562,018 B1* | 10/2013 | Wantin | 280/730.2 |
| 8,579,323 B2* | 11/2013 | Kato | B60R 21/213 280/729 |
| 8,651,516 B2* | 2/2014 | Kim | B60R 21/213 280/730.2 |
| 2005/0200103 A1 | 9/2005 | Burns et al. | |
| 2007/0052223 A1 | 3/2007 | Parkinson et al. | |
| 2012/0001407 A1 | 1/2012 | Cheal et al. | |
| 2013/0168950 A1 | 7/2013 | Nakamura et al. | |

FOREIGN PATENT DOCUMENTS

| | | | |
|---|---|---|---|
| DE | 10238513 A1 | 1/2004 | |
| DE | 10233595 A1 * | 2/2004 | ............ B60R 21/232 |
| EP | 1055566 B1 | 3/2004 | |
| EP | 1831057 B1 | 8/2008 | |
| JP | 2007-055545 A | 3/2007 | |

* cited by examiner

*Primary Examiner* — Paul N Dickson
*Assistant Examiner* — Joselynn Y Sliteris
(74) *Attorney, Agent, or Firm* — Global IP Counselors, LLP (57) ABSTRACT

A vehicle airbag assembly includes an attachment bracket, an elongated support member and an airbag. The attachment bracket attaches to a vehicle body member and includes a hinge portion. The elongated support member is pivotally connected to the attachment bracket for pivoting movement about a pivot axis defined by the hinge portion of the attachment bracket. The airbag is attached to the support member and defines a lengthwise direction. The pivot axis is non-parallel to the lengthwise direction. The airbag and the support member are movable together about the pivot axis. The hinge portion is configured to direct movement of the airbag and the support member from a stowed orientation to a deployed orientation upon inflation of the airbag.

21 Claims, 6 Drawing Sheets

VEHICLE AIRBAG ASSEMBLY

BACKGROUND

1. Field of the Invention

The present invention generally relates to a vehicle airbag assembly. More specifically, the present invention relates to an airbag assembly that is attached to the vehicle above a first area and is configured to pivot upon deployment covering a second area that is spaced apart from the first area.

2. Background Information

Airbag assemblies have become a standard feature in virtually all passenger vehicles. Several airbag assemblies are usually installed in a single vehicle. A curtain type airbag assembly is typically installed above an area over a window such that upon deployment of the airbag, the airbag covers the window.

SUMMARY

One object of the disclosure it to provide a vehicle having a first window and a second window with an airbag assembly that is installed above the first window, but upon deployment is configured to pivot and cover the second window.

Another object of the disclosure is to provide an airbag assembly with a mounting bracket and a support member that pivots relative to the mounting bracket such that the support member directs movement of the airbag away from the mounting bracket during airbag deployment.

In view of the state of the known technology, one aspect of the disclosure is a vehicle airbag assembly that includes an attachment bracket, an elongated support member and an airbag. The attachment bracket is configured to attach to a vehicle body member and includes a hinge portion. The elongated support member is pivotally connected to the attachment bracket for pivoting movement about a pivot axis defined by the hinge portion of the attachment bracket. The airbag is attached to the support member and defines a lengthwise direction. The pivot axis is non-parallel to the lengthwise direction. The airbag and the support member are movable together about the pivot axis. The hinge portion is configured to direct movement of the airbag and the support member from a stowed orientation to a deployed orientation upon inflation of the airbag.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
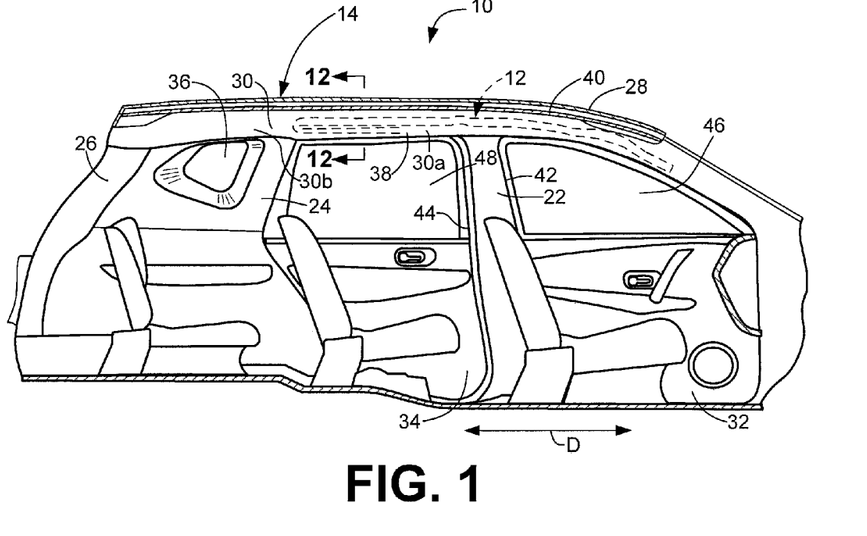
FIG. 1 is side cross-sectional view of a passenger compartment of a vehicle showing a first window, a second window and a pillar between the first and second windows with an airbag assembly installed above the first window in a stowed orientation in accordance with a first embodiment.

Referring initially to FIG. 1, a vehicle 10 that includes an airbag assembly 12 is illustrated in accordance with a first embodiment.

Figure 2:
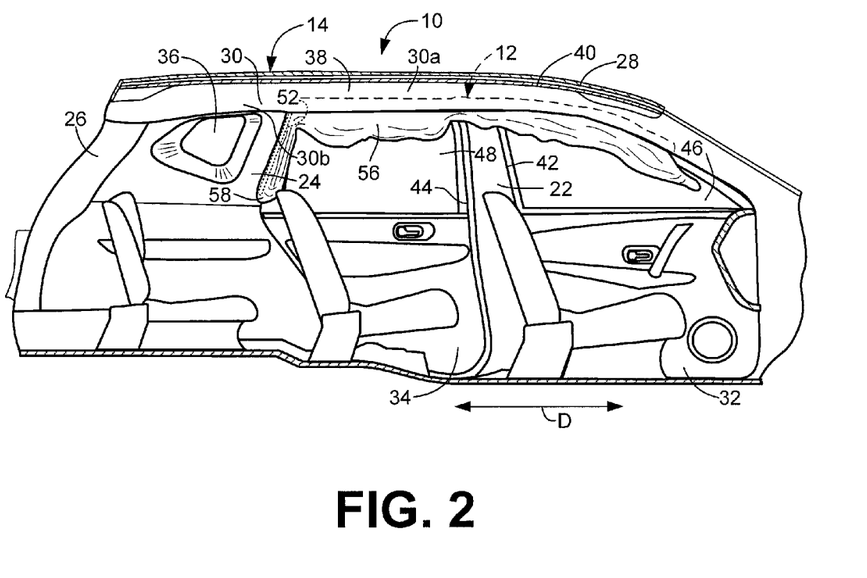
FIG. 2 is another side cross-sectional view of the passenger compartment of the vehicle showing the first window and the second window with the airbag assembly partially deployed in accordance with the first embodiment.

As shown in FIGS. 1 and 2, the vehicle 10 has a vehicle body structure 14 that includes, among other elements, an A-pillar 20, a B-pillar 22, a C-pillar 24, a D-pillar 26, a roof 28, a roof rail 30, a front side door 32, a rear side door 34, a rear side window 36, a trim panel 38 and a headliner 40, which are all conventional elements. The vehicle 10 defines a vehicle longitudinal direction D, as indicated in FIGS. 1 and 2. The roof rail 30 extends in the vehicle longitudinal direction D. The A-pillar 20, the B-pillar 22, the C-pillar 24, the D-pillar 26 are conventional generally upright members that are spaced apart from one another relative to the vehicle longitudinal direction D. Further, each of the A-pillar 20, the B-pillar 22, the C-pillar 24, and the D-pillar 26 includes an upper end that is fixedly attached to the roof rail 30 at spaced apart locations by, for instance, welding.

The A-pillar 20, the B-pillar 22 and the roof rail 30 define a front door opening 42. The front side door 32 is supported on the A-pillar 20 for movement between a closed position covering the front door opening 42, as shown in FIGS. 1 and 2 and an open position (not shown) in a conventional manner. The B-pillar 22, the C-pillar 24 and the roof rail 30 define a rear door opening 44. The rear side door 34 is supported on the B-pillar 22 for movement between a closed position, as shown in FIGS. 1 and 2 and an open position (not shown) in a conventional manner.

The front side door 32 includes an opening with a first side window 46 and the rear side door 34 includes an opening with a second side window 48. The first side window 46 and the second side window 48 are moveable within the front side door 32 and the rear side door 34 in a conventional manner.

In the depicted embodiment, the rear side window 36 is a fixed or stationary window that is fixedly installed within a window opening in the side of the vehicle 10 between the C-pillar 24, the D-pillar 26, and below the roof rail 30. The roof rail 30 includes a first section 30a and a second section 30b. The first section 30a extends forward in the vehicle longitudinal direction D toward the B-pillar 22 and the A-pillar 20 and away from the C-pillar 24. The second section 30b of the roof rail 30 extends rearward in the vehicle longitudinal direction D away from the C-pillar 24. The first section 30a of the roof rail 30, the B-pillar 22 and the C-pillar 24 at least partially define a rear door opening 42 (a first opening). The second section 30b of the roof rail 30 and the C-pillar 24 at least partially define the opening for the rear side window 36 (a second opening).

Figure 4:
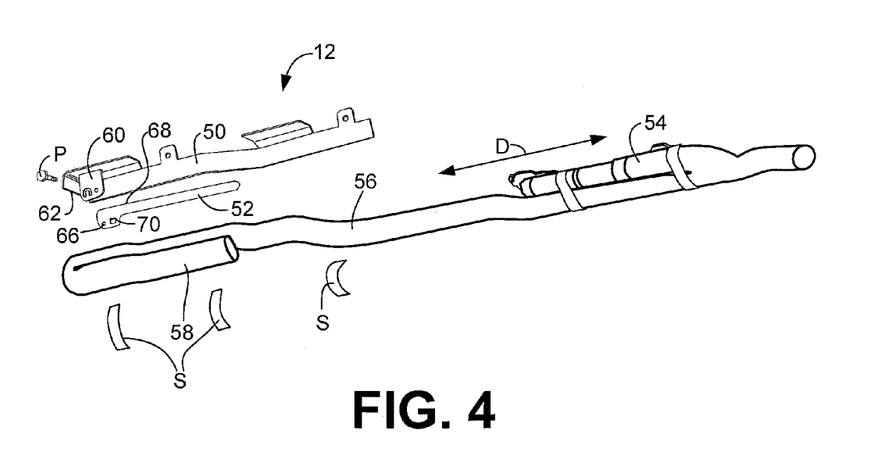
FIG. 4 is an exploded perspective view of an inboard side of the airbag assembly removed from the vehicle showing an attachment bracket that includes a hinge portion, a support member that pivots about the hinge portion, an inflatable main cushion, an inflatable cushion extension and an inflation device in accordance with the first embodiment.
Figure 5:
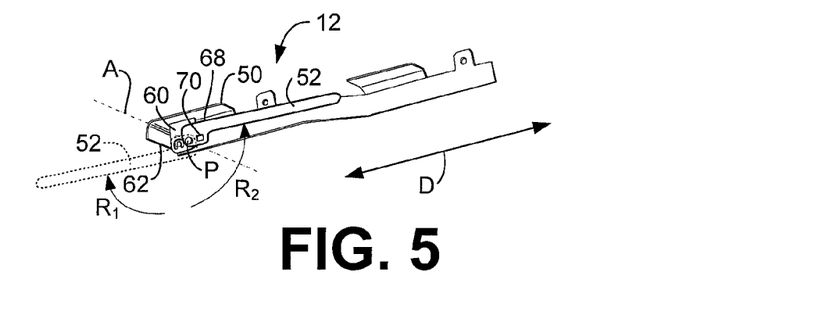
FIG. 5 is a perspective view showing the attachment bracket with the support member installed to the hinge portion, the support member shown in solid lines in the stowed orientation and in phantom in the deployed orientation in accordance with the first embodiment.

A description of the airbag assembly 12 is now provided with specific reference to FIGS. 4-14. As shown in FIG. 4, the airbag assembly 12 basically includes an attachment bracket 50, a support member 52, an inflation device 54, a main airbag section 56, an extension airbag section 58 and frangible strapping S that retains the main airbag section 56 and the extension airbag section 58 to the attachment bracket 50. The frangible strapping S can be made of a material that releases the main airbag section 56 and the extension airbag section 58 from the attachment bracket 50 upon airbag deployment.

Figure 12:
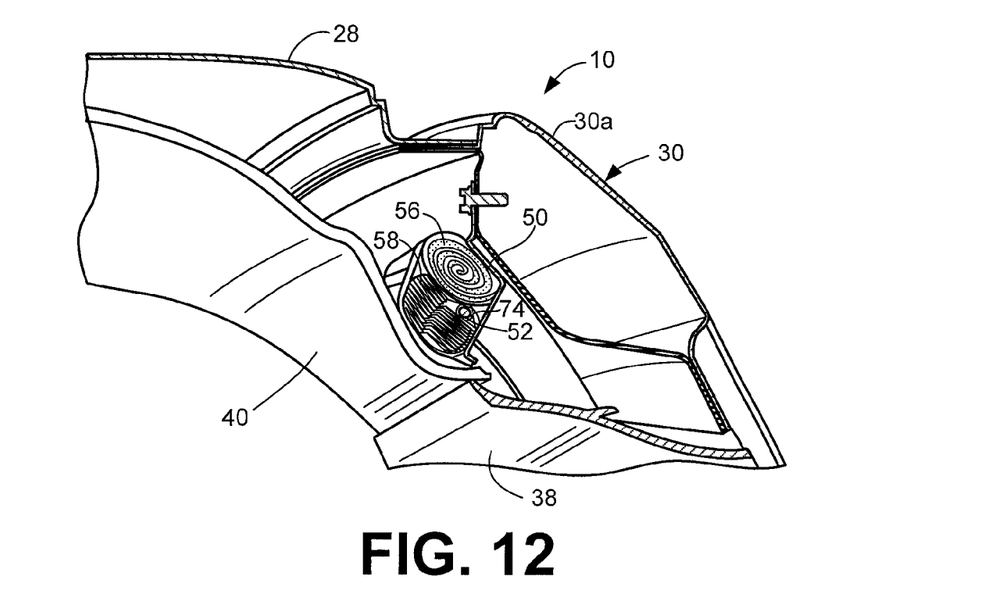
FIG. 12 is a cross sectional view of a portion of the vehicle above the first window taken along the line 12-12 in FIG. 1 showing the airbag assembly in the stowed orientation in accordance with the first embodiment.
Figure 13:
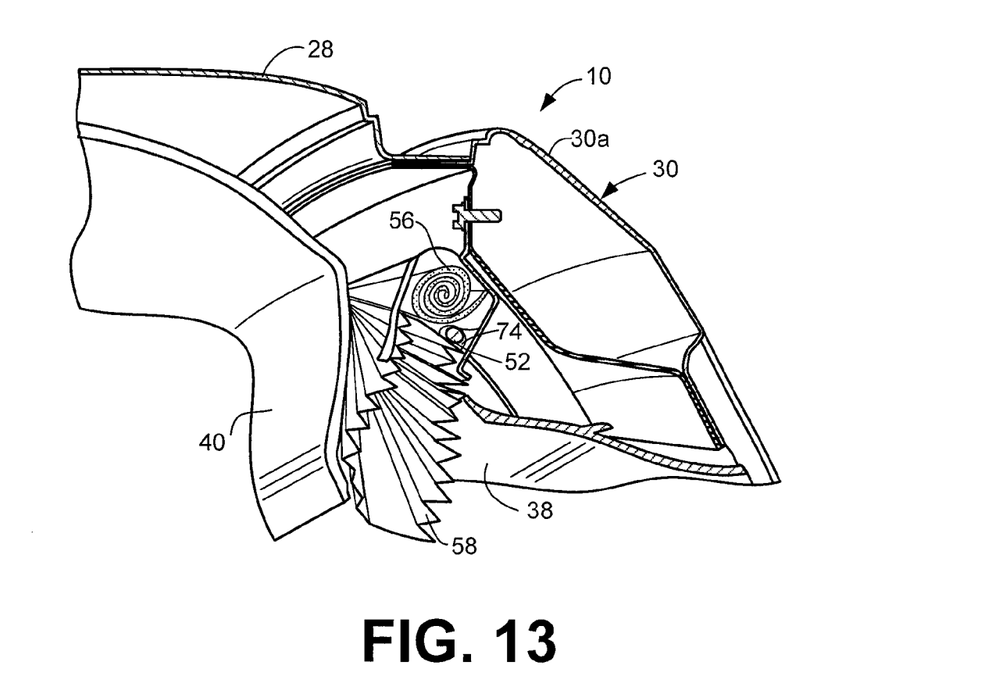
FIG. 13 is another cross-sectional view similar to FIG. 12 showing the airbag assembly in the partially deployed orientation in accordance with the first embodiment.

The attachment bracket 50 is configured to attach to the first section 30a of the roof rail 30 (a vehicle body member) as shown in FIGS. 12 and 13. As shown in FIGS. 4-8, the attachment bracket 50 includes a hinge portion 60, a stop projection 62 and a locking element 64. The hinge portion 60 defines a pivot axis A with the support member 52 being pivotally attached thereto. Specifically, the support member 52 pivots relative to the attachment bracket 50 about the pivot axis A.

Figure 3:
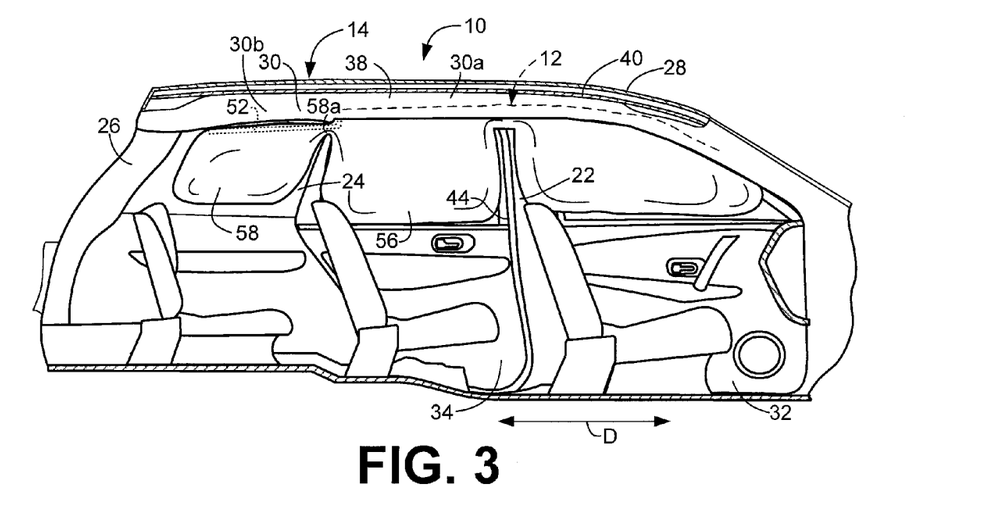
FIG. 3 is yet another side cross-sectional view similar to FIGS. 1 and 2 showing the airbag assembly in a deployed orientation covering both the first and second windows in accordance with the first embodiment.
Figure 6:
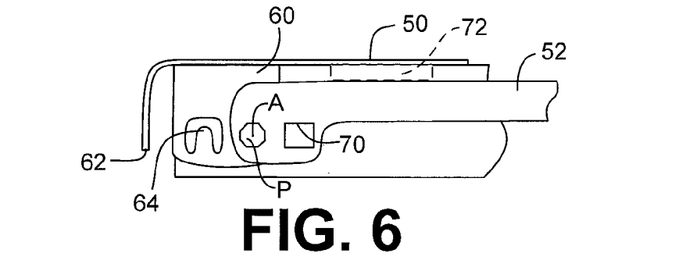
FIG. 6 is a side view of a portion of the attachment bracket and the support member connected to the hinge portion in the stowed orientation, showing a stop projection and a locking mechanism in accordance with the first embodiment.
Figure 7:
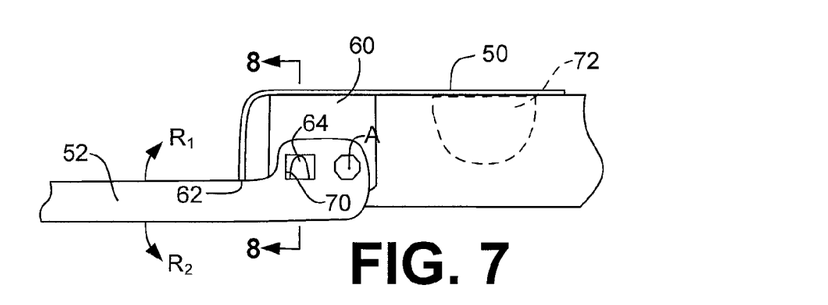
FIG. 7 is another side view of the portion of the attachment bracket and the support member depicted in FIG. 6, showing the support member in the deployed orientation with the stop projection preventing rotation of the support member relative to a first rotation direction and the locking mechanism engaged to prevent movement of the support member in a second rotation direction opposite the first rotation direction in accordance with the first embodiment.
Figure 11:
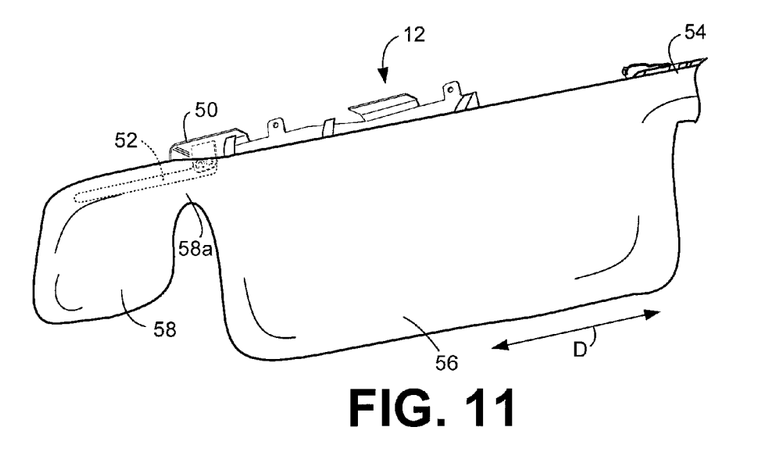
FIG. 11 is another perspective view similar to FIGS. 9 and 10 showing the airbag assembly in the deployed orientation in accordance with the first embodiment.

The support member 52 is an elongated member, such as a rod, that is pivotally connected to the hinge portion 60 of the attachment bracket 50 by a pivot pin P for pivoting movement between a stowed orientation (FIGS. 1, 5-6 and 9) and a deployed orientation (FIGS. 3, 7 and 11). As shown in FIG. 4, the support member 52 includes a pivot pin receiving aperture 66, a stop surface 68 and a stop opening 70. The support member 52 is preferably made of a rigid core surrounded by a padded material. A rigid core is appropriate in order to ensure rapid rotation from the stowed orientation to the deployed orientation and the padded material is appropriate to ensure that during movement the airbag material is not torn or stressed during deployment.

Figure 8:
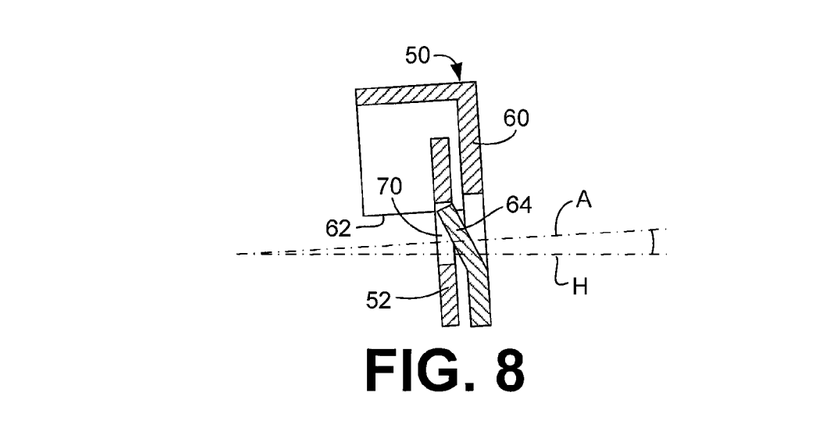
FIG. 8 is a cross-sectional view of the attachment bracket and the support member taken along the line 8-8 in FIG. 7, showing the locking mechanism contacting the support member to prevent rotation in the second rotation direction in accordance with the first embodiment.

As shown in FIG. 8, the locking element 64 of the attachment bracket 50 is a tab or projection that extends in an inboard direction relative to the remainder of the attachment bracket 50. As shown in FIGS. 5-8, when the support member 52 is rotated in a rotation direction $R_1$ from the stowed orientation (FIG. 6) to the deployed orientation (FIGS. 7 and 8), the stop surface 68 of the support member 52 contacts the stop projection 62 of the attachment bracket 50. Consequently, further rotation in the rotation direction $R_1$ is prevented. Further, once in the deployed orientation shown in FIGS. 7 and 8, the stop projection 62 extends into the stop opening 70 in the support member 52, preventing reverse rotation of the support member 52 in a rotation direction $R_2$ as shown in FIG. 8.

The inflation device 54 is configured to attach to the roof rail 30 at a location spaced apart from the attachment bracket 50. However, it should be understood from the drawings and the description herein that the inflation device 54 can be installed at any convenient location within the vehicle 10 that facilitates rapid inflation of the main airbag section 56 and the extension airbag section 58. For example, the inflation device 54 can alternatively be attached directly to the attachment bracket 50. However, in the depicted embodiment, the inflation device 54 is configured to be installed to a location spaced apart from the attachment bracket 50 above the front door opening 42. The inflation device 54 is a conventional element that is pneumatically connected to the main airbag section 56 in order to rapidly inflate the main airbag section 56 and the extension airbag section 58 upon deployment in a conventional manner. The inflation device 54 is a pyrotechnic device that is configured to rapidly produce air pressure to inflate the airbag assembly 12 upon deployment. Since inflation devices 54 are well-known in the art, further description is omitted for the sake of brevity.

It should also be understood from the drawings and description herein that the airbag assembly 12 includes a triggering mechanism (not shown) that causes the inflation device 54 to deploy upon detection of an impact event and to inflate the main airbag section 56 and the extension airbag section 58. However, since such triggering mechanisms are well-known, further description is omitted for the sake of brevity.

As shown in FIGS. 6 and 7, the attachment bracket 50 can optionally include an auxiliary deployment mechanism 72 that is mounted to the attachment bracket 50 adjacent to the support member 52. The auxiliary deployment mechanism 72 is an expandable or pyrotechnic device that is configured to urge the support member 52 from the stowed orientation to the deployed orientation upon deployment of the airbag assembly 12. In FIG. 6, the auxiliary deployment mechanism 72 is shown prior to deployment of the airbag assembly 12. In FIG. 7, the auxiliary deployment mechanism 72 is shown after deployment of the airbag assembly 12. The auxiliary deployment mechanism 72 can alternatively be provided with expanding gases from the inflation device 54. Further, in another alternative embodiment, the auxiliary deployment mechanism 72 can be integrated into the hinge portion 60 of the attachment bracket 50 to pivot the support member 52 about the pivot axis A.

The main airbag section 56 and the extension airbag section 58 are pneumatically connected to one another such that upon deployment, both are supplied with pneumatic pressure from the inflation device 54. In other words, the main airbag section 56 is a first inflatable cushion and the extension airbag section 58 is a second inflatable cushion that inflates as a result of a vehicle impact event.

As indicated in FIG. 3, the main airbag section 56 and the extension airbag section 58 are joined together by bridging portion 58a. The main airbag section 56, the extension airbag section 58 and the bridging portion 58a are all made of the same material, such as an airtight canvas material. The bridging portion 58a is dimensioned such that in the stowed orientation (FIGS. 9 and 10), the bridging portion 58a defines a fold between the main airbag section 56 and the extension airbag section 58. Hence, in the stowed orientation, the bridging portion 58a is adjacent to the hinge portion 60 of the attachment bracket 50.

Figure 9:
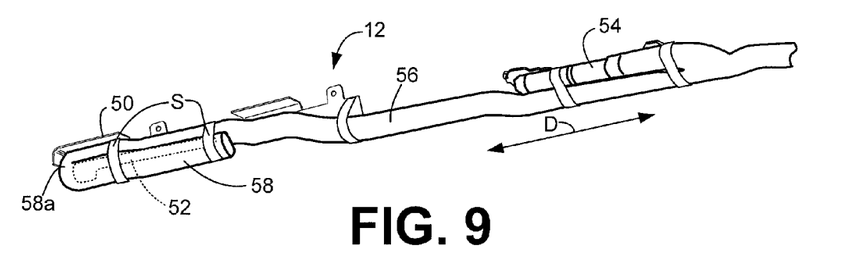
FIG. 9 is a perspective view of the inboard side of the airbag assembly removed from the vehicle in a stowed orientation in accordance with the first embodiment.
Figure 10:
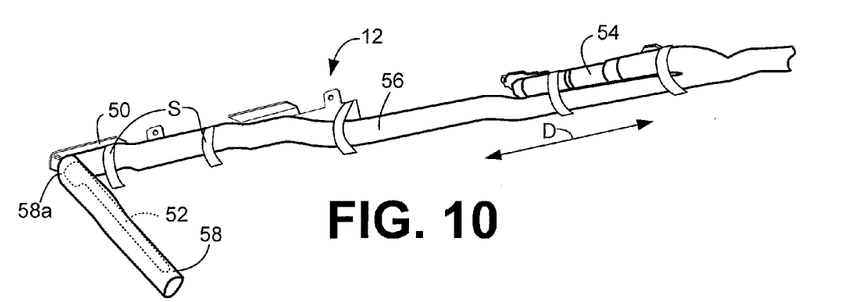
FIG. 10 is another perspective view similar to FIG. 9 showing the airbag assembly partially deployed with the support member and the inflatable cushion extension pivoted to a partially deployed orientation between the stowed orientation and the deployed orientation in accordance with the first embodiment.

As shown in FIGS. 1-3 and 9-13, the main airbag section 56 and the extension airbag section 58 initially are coupled to roof rail 30 of the vehicle body structure 14 by the attachment bracket 50 in a stowed position (FIGS. 1, 9 and 12). Upon deployment, the main airbag section 56 and the extension airbag section 58 begin to inflate and the support member 52 and the extension airbag section 58 begin moving away from the stowed orientation to a partially inflated orientation, as shown in FIGS. 2, 10 and 13. As the deployment progresses, the main airbag section 56 and the extension airbag section 58 fully inflate to achieve the deployed orientation as shown in FIGS. 3 and 11. Hence, the main airbag section 56 and the extension airbag section 58 are dimensioned, upon inflation, to extend downward over the second side window 48 and the rear side window 36. However, the bridging portion 58a can have reduced dimensions such that at least a portion of the C-pillar 24 is not covered, as shown in FIG. 3.

Figure 14:
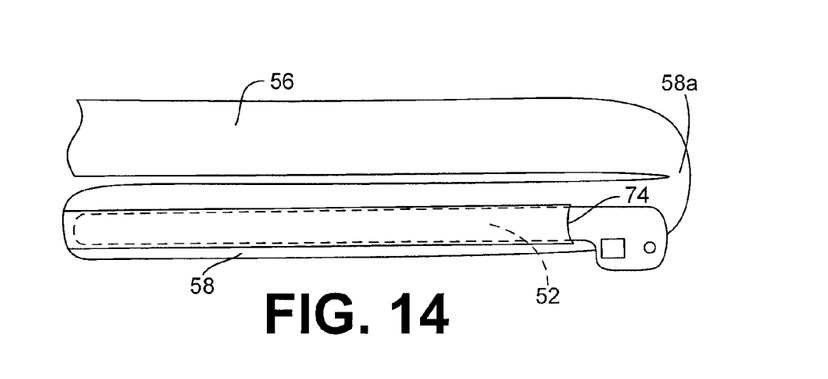
FIG. 14 is a side view of an outboard side of the airbag assembly showing a sleeve or pocket that receives the support member in accordance with the first embodiment.

As is shown in FIGS. 10 and 11, the hinge portion 60 is configured and oriented to direct movement of the support member 52 and the extension airbag section 58 from the stowed orientation to the deployed orientation upon the initiation of airbag deployment. More specifically, the pivot axis A of the hinge portion 60 is oriented to control the direction of deployment of the extension airbag section 58. The extension airbag section 58 is directly connected to the support member 52 such that the extension airbag section 58 and the support member 52 move together from the stowed orientation to the deployed orientation. Specifically, as shown in FIGS. 12-14, the extension airbag section 58 includes a sleeve or elongated pocket 74 that is specifically dimensioned to receive and retain a majority of the support member 52.

The elongated pocket 74 is located on an outboard side of the extension airbag section 58 such that as the main airbag section 56 and the extension airbag section 58 move from the stowed orientation to the deployed orientation, the support member 52 is maintained outboard of the extension airbag section 58. As shown in FIG. 14, the elongated pocket 74 has an overall length that is sufficient to receive a majority of the support member 52. The elongated pocket 74 is made of the same or similar material as the main airbag section 56 and the extension airbag section 58. The elongated pocket 74 is sewn to the fabric of the extension airbag section 58. The elongated pocket 74 can alternatively be made of other fabric or textile material sufficiently strong to withstand the forces associated with airbag deployment, but flexible enough to move with the expansion of the extension airbag section 58 during deployment.

The pivot axis A of the hinge portion 60 has a non-parallel relationship relative to the vehicle longitudinal direction D. The attachment bracket 50 defines its own lengthwise direction that preferably coincides with the vehicle longitudinal direction D. In other words, the attachment bracket 50 is installed to the roof rail 30 (as shown in FIGS. 12 and 13) such that the attachment bracket 50 extends in the vehicle longitudinal direction D. The pivot axis A extends in a direction that is angularly offset from the vehicle longitudinal direction D. In the depicted embodiments, the pivot axis A is perpendicular to the vehicle longitudinal direction D, and is inclined slightly with respect to horizontal H, as indicated in FIG. 8, by an angle that is between 1 and 10 degrees.

As indicated in FIGS. 1-3 and shown in FIGS. 12 and 13, the attachment bracket 50 is attached to the first section 30a of the roof rail 30. More specifically, the attachment bracket 50 is installed to the roof rail 30 at a location forward of the C-pillar 24 and rearward of the A-pillar 20 and B-pillar 22. Hence, the main airbag section 56 and the extension airbag section 58 are both located above the second side window 48 of the rear side door 34 (the first opening) in the stowed orientation (FIG. 1). As shown in FIG. 12, the airbag assembly 12 is concealed by the headliner 40, the trim panel 38 and the roof rail 30.

As shown in FIGS. 12 and 13, the main airbag section 56 is rolled up in the stowed orientation, and the extension airbag section 58 is folded in a series of overlaying sections sometimes referred to as accordion-style. Upon deployment, the main airbag section 56 unrolls, becoming a curtain and the extension airbag section 58 unfolds as it begins to inflate, pushing an outboard edge portion of the headliner 40 out and downward from a retention position above the trim panel 38, as shown in FIG. 13. Once fully deployed, the main airbag section 56 unrolls and extends downward, serving as a fabric-wrapped air curtain covering at least the second side window 48 of the rear side door 34 (see FIG. 3). Once fully moved to the deployed orientation, the extension airbag section 58 and the support member 52 pivot about the pivot axis A, extending across an inboard surface (or interior surface) of the C-pillar 24 and covering the rear side window 36 (see FIG. 3). Further, once moved to the deployed orientation, the support member 52 locks into the deployed orientation and remains above the rear side window 36, thereby maintaining the position of the extension airbag section 58 in the deployed orientation and covering the rear side window 36.

In the stowed orientation shown in FIGS. 6, 9 and 12, the extension airbag section 58 and the support member 52 extend in a first direction from the hinge portion 60. In the depicted embodiment, the first direction is a forward direction relative the vehicle 10. In the deployed orientation shown in FIGS. 3, 7 and 11, the extension airbag section 58 extends in a second direction from the hinge portion 60. In the depicted embodiment the second direction is a rearward direction relative the vehicle 10. In the depicted embodiment the support member 52 and the extension airbag section 58 undergo angular displacement or rotation from the stowed orientation to the deployed orientation at an angle approximately equal to 180 degrees. However, the actual angular displacement from the stowed orientation to the deployed orientation can be changed depending upon the application of the airbag assembly 12 within a specific vehicle. For example, in some vehicles, an angle of only 135 degrees from the stowed orientation to the deployed orientation can be utilized. However, it should be understood that any numeric value of the angular displacement of the support member 52 can be achieved using the airbag assembly 12 through slight variations in the orientation of the hinge portion 60, such as by changing the location of the stop projection 62 and/or the locking element 64 of the hinge portion 60, and/or by changing the location of the stop opening 70 of the support member 52. Thus, total angular displacement of the support member 52 during movement from the stowed orientation to the deployed orientation can be limited to 135 degrees, 145 degrees, 165 degrees or any numeric value between 135 degrees and 180 degrees.

Figure 15:
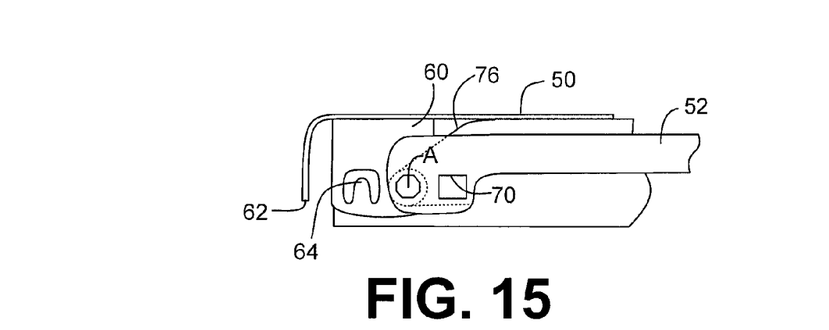
FIG. 15 is a side view of a portion of the attachment bracket and the support member connected to the hinge portion in the stowed orientation showing an optional biasing spring in accordance with a modification to the first embodiment.

The first embodiment of the airbag assembly 12 can be modified such that the support member 52 includes an optional spring 76 that biases the support member 52 to move from the stowed orientation to the deployed orientation upon deployment of the airbag assembly 12, as shown in FIG. 15.

Second Embodiment

Figure 16:
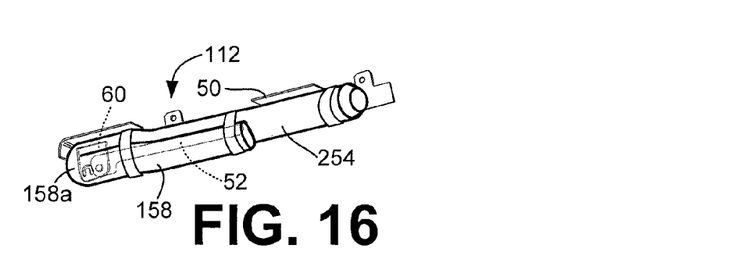
FIG. 16 is a perspective view of an airbag assembly removed from the vehicle showing an attachment bracket that includes a hinge portion, a support member that pivots about the hinge portion, an inflatable cushion and an inflation device in accordance with a second embodiment.
Figure 17:
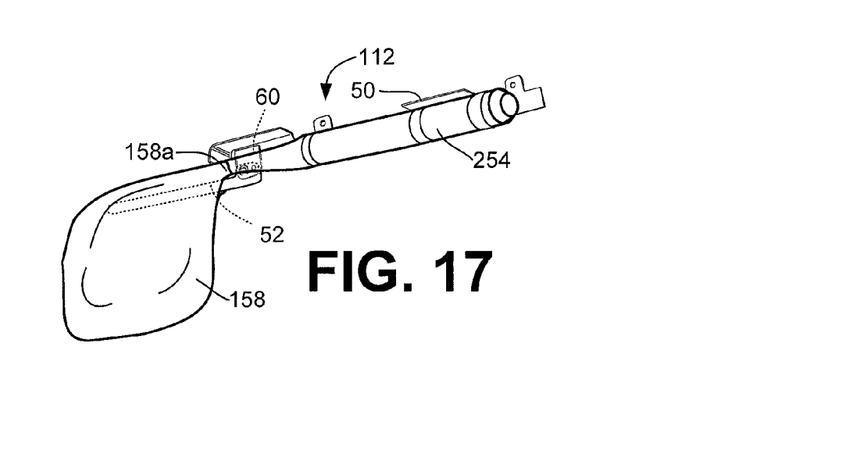
FIG. 17 is another perspective view similar to FIG. 16 showing the airbag assembly in the deployed orientation in accordance with the second embodiment.

Referring now to FIGS. 16 and 17, an airbag assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the airbag assembly 112 includes the attachment bracket 50, the hinge portion 60 and the support member 52 as described above with respect to the first embodiment. In the second embodiment, the inflation device 54 of the first embodiment is replaced with an inflation device 254. Further, in the second embodiment, the main airbag section 56 and the extension airbag section 58 of the first embodiment are eliminated and replaced with a single airbag 158 (an inflatable cushion) and a bridging section 158a.

The inflation device 254 is directly mounted to the attachment bracket 50 and is pneumatically connected to the bridging section 158a of the airbag 158. The bridging section 158a is dimensioned to fold in a manner consistent with the bridging section 58a of the first embodiment adjacent to the hinge portion 60 of the attachment bracket 50. The airbag 158 is dimensionally similar or the same as the extension airbag section 58 of the first embodiment. In other words, there is no main airbag section 56 or its equivalent present in the airbag assembly 112.

In the second embodiment and the stowed orientation depicted in FIG. 16, the bridging section 158a is folded such that the airbag 158 is folded accordion style and retained alongside the inflation device 254. In the inflated orientation depicted in FIG. 17, the bridging section 158a is unfolded, the support member 52 pivots to the deployed orientation and the airbag 158 is inflated, extending downward from the support member 52.

In the second embodiment, the attachment bracket 50 can be attached above a first location (such as the first section 30a of the roof rail 30), with the entire airbag assembly 112 retained along the attachment bracket 50. Upon deployment, the airbag 158 pivots away from the attachment bracket 50 with a majority of the support member 52 likewise being pivoted away from the attachment bracket 50 in the deployed orientation. Further, the airbag 158 extends downward from the support member 52 completely spaced apart from the attachment bracket 50 covering an area spaced apart from the first location (for example, the airbag 158 can cover the rear side window 36 depicted in FIG. 1).

As mentioned above, the airbag assemblies 12 and 112 can include a triggering mechanism (not shown) that detects a vehicle impact event and triggers ignition of the inflation devices 54 and 254. The triggering mechanism can further include a controller having a microcomputer and a motion detector with an airbag deployment control program that controls the inflation device and deployment of the airbag assemblies 12 and 112. The controller can also include other conventional components such as an input interface circuit, an output interface circuit, and storage devices such as a ROM (Read Only Memory) device and a RAM (Random Access Memory) device. The memory circuit stores processing results and control programs such as ones for ignition operation of the inflation device that are run by the processor circuit. The controller is operatively coupled to the triggering mechanism and the airbag assemblies 12 and 112 in a conventional manner. It will be apparent to those skilled in the art from this disclosure that the precise structure and algorithms for the controller can be any combination of hardware and software that will carry out the functions of the present invention.

The various features of the vehicle 10 related to the vehicle body structure 14, other than the airbag assemblies 12 and 112, are conventional components that are well-known in the art. Since these vehicle components and features are well-known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle airbag assembly. Accordingly, these terms, as utilized to describe the present invention should be interpreted relative to a vehicle equipped with the vehicle airbag assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function relating to airbag deployment.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle airbag assembly comprising:
an attachment bracket configured to attach to a vehicle body member and including a hinge portion;
an elongated support member having a first end pivotally connected to the attachment bracket for pivoting movement about a pivot axis defined by the hinge portion of the attachment bracket; and
an airbag having at least a portion thereof extending alongside the support member from the pivot axis to a distal end of the support member, the portion of the airbag being attached to the support member, the portion of the airbag and the support member being pivotal together about the pivot axis, the hinge portion directing pivoting movement of the portion of the airbag and the support member from a stowed orientation to a deployed orientation upon inflation of the airbag such that in the stowed orientation the portion of the airbag and the support member extend alongside the attachment bracket, and in the deployed orientation the portion of the airbag and the distal end of the support member are pivoted away from the attachment bracket.

2. The vehicle airbag assembly according to claim 1, wherein
the portion of the airbag and support member extend in a first direction from the hinge portion and along the attachment bracket while in the stowed orientation and in a second direction in the deployed orientation with the second direction and the first direction defining an angle therebetween that is greater than 135 degrees.

3. The vehicle airbag assembly according to claim 2, wherein
the angle defined between the first direction and the second direction is equal to or less than 180 degrees.

4. The vehicle airbag assembly according to claim 1, wherein
the portion of the airbag is pneumatically connected to a main airbag that is supported by the attachment bracket and spaced apart from the support member.

5. The vehicle airbag assembly according to claim 1, further comprising
a pyrotechnic device that moves the support member from the stowed orientation to the deployed orientation.

6. The vehicle airbag assembly according to claim 5, wherein
the pyrotechnic device applies force to the support member causing the support member and the portion of the airbag to move from the stowed orientation to the deployed orientation.

7. The vehicle airbag assembly according to claim 1, wherein
the support member is biased to move to the deployed orientation.

8. The vehicle airbag assembly according to claim 1, wherein
the vehicle body member is a roof rail.

9. A vehicle body structure comprising:
a first pillar structure;
a roof rail extending in a vehicle longitudinal direction, a portion of the roof rail being fixedly attached to an upper end of the first pillar structure, a first section of the roof rail extending in a first direction away from the first pillar structure and a second section of the roof rail extending in a second direction away from the first pillar structure opposite the first direction, the first section of the roof rail and the first pillar structure at least partially defining a first opening in the vehicle body structure, and the second section of the roof rail and the first pillar structure at least partially defining a second opening in the vehicle body structure;
a trim element coupled to the roof rail covering the roof rail; and
an airbag including an attachment bracket attached to the first section of the roof rail, a support member having a first end pivotally connected to the attachment bracket and an inflatable cushion extension extending alongside the support member to proximate a distal end of the support member, the inflatable cushion extension being attached to the support member, with the inflatable cushion extension and the support member located above the first opening between the trim element and the first section of the roof rail while in a stowed orientation, and the inflatable cushion extension being configured and arranged to pivot with the support member relative to the attachment bracket upon deployment and extend across an interior surface of the first pillar structure to cover the second opening while in a deployed orientation such that in the stowed orientation the inflatable cushion extension of the airbag and the support member extend alongside the attachment bracket, and in the deployed orientation the inflatable cushion extension of the airbag and the distal end of the support member are pivoted away from the attachment bracket.

10. The vehicle body structure according to claim 9, wherein
the attachment bracket includes a hinge portion, and the support member is configured and arranged for pivoting movement about the hinge portion of the attachment bracket upon deployment.

11. The vehicle body structure according to claim 10, wherein
the hinge portion is configured and oriented to direct movement of the cushion extension and the support member from the stowed orientation to the deployed orientation upon inflation of the cushion extension.

12. The vehicle body structure according to claim 11, wherein
the cushion extension and the support member extend in a first direction from the hinge portion while in the stowed orientation and extend in a second direction from the hinge portion while in the deployed orientation, with the second direction and the first direction defining an angle therebetween that is greater than 135 degrees.

13. The vehicle body structure according to claim 12, wherein
the angle defined between the first direction and the second direction is equal to or less than 180 degrees.

14. The vehicle body structure according to claim 9, wherein
the airbag further includes a pyrotechnic device that moves the cushion extension and the support member from the stowed orientation to the deployed orientation.

15. The vehicle body structure according to claim 14, wherein
the pyrotechnic device applies force to the support member causing the support member and the cushion extension to move from the stowed orientation to the deployed orientation.

16. The vehicle body structure according to claim 14, wherein
the pyrotechnic device provides pneumatic force to the airbag upon deployment of the airbag causing both the cushion extension and the support member to move from the stowed orientation to the deployed orientation.

17. The vehicle body structure according to claim 9, wherein
the cushion extension is pneumatically connected to an inflatable main section of the airbag that is supported by the attachment bracket and spaced apart from the support member, the main section covering the first opening while in the deployed orientation.

18. The vehicle body structure according to claim 9, wherein
trim element is a headliner component.

19. The vehicle body structure according to claim 9, further comprising:
a second pillar structure having an upper end fixedly attached to an area of the first section of the roof rail spaced apart from the first pillar structure; and
a door assembly pivotally connected to the second pillar structure for movement between an open position and a closed position, the door assembly including a window panel that covers at least a portion of the first opening when the door assembly is in the closed position.

20. The vehicle body structure according to claim 9, further comprising
a window panel coupled to the first pillar structure and the roof rail that covers the second opening.

21. A vehicle airbag assembly comprising:
an attachment bracket configured to attach to a vehicle body member and including a hinge portion;
an elongated support member having a first end pivotally connected to the attachment bracket for pivoting movement about a pivot axis defined by the hinge portion of the attachment bracket; and
an airbag having a first portion attached to and extending along the attachment bracket and a second portion extending along the support member from the hinge portion to a distal end of the support member, the second portion of the airbag being attached to the support member, the second portion of the airbag and the support member being movable together about the pivot axis from a stowed orientation to a deployed orientation upon inflation of the airbag such that in the stowed orientation the second portion and the support member extend alongside the attachment bracket such that the airbag has an overall first length, and in the deployed orientation with the distal end of the support member and the second portion being pivoted away from the attachment bracket the airbag has an overall second length that is greater than the first length.

* * * * *